Figure 1:
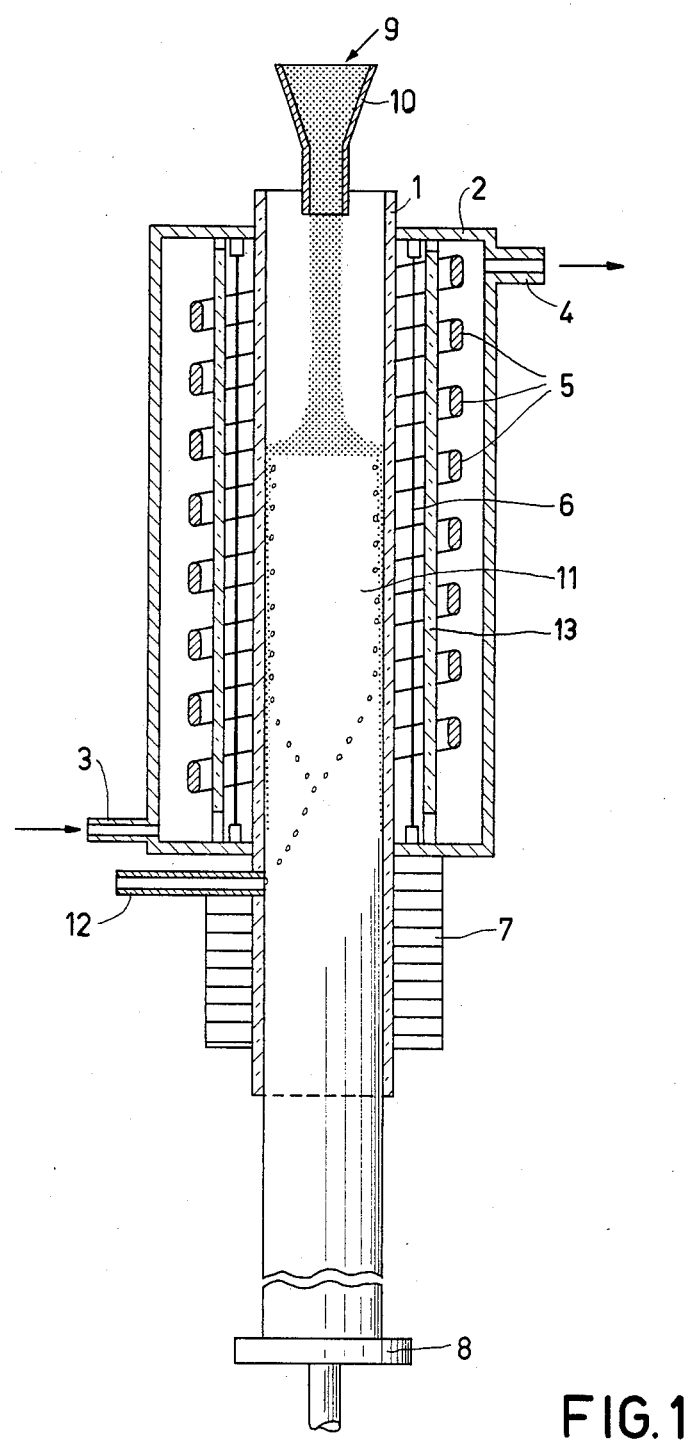

United States Patent [19]

Meerman

[11] Patent Number: 4,546,484

[45] Date of Patent: Oct. 8, 1985

[54] DEVICE FOR THE CONTINUOUS MANUFACTURE OF ELONGATED BODIES STARTING FROM UNMOLTEN SOLID STARTING MATERIAL

[75] Inventor: Wilhelmus C. P. M. Meerman, Eindhoven, Netherlands

[73] Assignee: U.S. Philips Corporation, New York, N.Y.

[21] Appl. No.: 549,118

[22] Filed: Nov. 7, 1983

[30] Foreign Application Priority Data

Nov. 16, 1982 [NL] Netherlands ............... 8204438

[51] Int. Cl.$^4$ .............................................. C03B 5/02
[52] U.S. Cl. ......................................... 373/27; 373/138
[58] Field of Search .................... 65/137, 187, 356; 219/10.49 R, 10.61 R; 373/27, 30, 138, 151–160, 165, 139

[56] References Cited

U.S. PATENT DOCUMENTS

| | | | |
|---|---|---|---|
| 1,572,873 | 2/1926 | Allcutt | 373/151 |
| 2,673,228 | 3/1954 | Kistler | 373/152 |
| 4,339,625 | 7/1982 | Delassus et al. | 219/10.49 R |

Primary Examiner—Reinhard J. Eisenzopf
Assistant Examiner—Gregory D. Thompson
Attorney, Agent, or Firm—Paul R. Miller

[57] ABSTRACT

A device for continuously making elongated bodies, particularly rods of glass or optical fibers, includes a melting tube for containing molten material and surrounded by a cooling jacket. Within the cooling jacket exists a high frequency electromagnetic coil for heating and melting the starting material in the melting tube. A plurality of metal wires extending parallel to the axis of the melting tube and being grounded as well as a tube of insulating material are located between the wall of the melting tube and the coil. The melt traverses a heating zone and a refining zone so that a solid elongated body is withdrawn from the bottom of the melting tube.

5 Claims, 2 Drawing Figures

DEVICE FOR THE CONTINUOUS MANUFACTURE OF ELONGATED BODIES STARTING FROM UNMOLTEN SOLID STARTING MATERIAL

The invention relates to a method of and a device for the continuous manufacture of elongated bodies, for example rods, in which solid starting material for making the bodies is supplied continuously to a melt which is present in a vertically arranged tube and an elongated body is withdrawn in a solid form from the bottom of the tube.

Methods of this kind and devices for carrying out such methods of melting quartz glass are known, for example from U.S. Pat. No. 3,764,286.

In prior art methods and devices, no attention is generally paid to possible contamination of the melt by furnace material, nor are any measures suggested to prevent such contamination.

It is known per se, for example from Opto-Electronics 5 (1973), pp. 285–288, to melt high-purity glasses destined for the batchwise manufacture of optical fibers in a cooled crucible, the contents of which are heated inductively and/or capacitively by means of a high-frequency field. Experiments have demonstrated that the efficiency in the described arrangement is not optimal.

No indications can be derived from this prior art how, for example, tubes and rods of glass having a purity suitable for the manufacture of optical fibers could be manufactured continuously.

It is an object of the invention to provide a method of continuously manufacturing elongated bodies, for example rods, of unmolten solid starting material and a device for carrying out such a method and aims at achieving a maximumal efficiency of the high-frequency power used.

It is a further object of the invention to warrant a maximal safety to personnel operating such a device.

A method which can satisfy this object is characterized in that a. the starting material is continuously supplied to a melt which is present in the upper part of a vertically arranged tube, the walls of which tube are cooled, b. the melt in the upper part of the tube is heated by means of a high-frequency magnetic field (heating zone) while cooling the wall, c. the melt then passes through a zone of lower temperature in the cooled tube, d. after which the melt solidifies in a subsequent zone and thereafter leaves the tube in the form of a solid elongate body. A refining of the melt may take place in the zone of lower temperature (c). In the subsequent zone the material solidified and may relax. The starting material in the manufacture of rods may be glass or a mixture of starting substances, for example, a glass forming mixture, that is to say a mixture of oxides, carbonates and/or other compounds and/or of fragments of glass.

The starting material is continuously deposited on the melt. The starting material is melted by contact with the hot melt and by absorption of IR radiation emanating from the underlying heating zone.

The melt in the heating zone is preferably heated to such a high temperature that the rate of the reaction between the components of the glass is as high as possible, in which, however, the temperature at the surface of the melt may not be so high that significant quantities of components can escape from the melt by evaporation.

The temperature in the heating zone can be controlled by coupling more or less power via the high-frequency field with the melt.

A suitable device for carrying out the method according to the invention comprises a vertically arranged melting tube in which starting material is melted and which in the heating zone and an underlying zone comprises a cooling jacket through which a coolant is passed during operation, a coil of metal tape with which during a curing operation a high frequency electromagnetic field is generated and which is present within the cooling jacket around a heating zone, a screen of metal wires extending parallel to the axis of the tube between the coil and the wall of the tube, a tube of a material having a high breakdown voltage and a low tan $\delta$ which is present between the screen of metal wires and the coil, all this being arranged so that within the cooling jacket the coolant flows around the coil and screen.

In the cooled melting tube a glass melt traverses the heating zone and then a zone of lower temperature in which refining of the glass may take place and the viscosity of the glass increases. In the refining zone the oxygen equilibrium can be adjusted in a conventional manner by means of refining means. As a result of the high temperature in the heating zone, the glass is already free from dissolved gases ($N_2$, $CO_2$). In the cooled part of the tube underlying the refining zone the temperature of the glass decreases to the solidification temperature, after which the glass leaves the cooled part of the tube. If desired, an annealing furnace may then be used so as to adjust a given temperature gradient. Relaxation of the solidified glass takes place in this furnace.

In the device according to the invention the melt carries no voltage with respect to ground.

The high-frequency power used is used optimally in that the ratio of the diameter of the melting tube to the diameter of the coil can be chosen to be as large as possible. Or in other words, by accommodating the coil and the screen in the coolant, the coil can be provided as close as possible to the wall of the melting tube.

The frequency of the current preferably exceeds 1 MHz.

It has been found in practice that when the device according to the invention is used, the use of flowing coolant preferably wakes around the coil and the ground screen prevents formation of gas discharges outside the melting tube. Such discharges could cause serious accidents to operating personnel. In consequence of the ground screen there is no capacitive field inside the melting tube. A thermocouple can now be inserted into the glass melt without causing the forming of a plasma.

It may be advantageous to blow a dry gas into the glass melt below the heating zone. As a result of this the glass melt is mixed and moreover dried. Suitable gases are dry helium and dry oxygen. Dissolved gases and chemically bound water may be removed by rising large gas bubbles.

In the device according to the invention the melting tube consists of a material having low dielectric losses at the frequency of the field used. A suitable material is quartz glass; other materials which may be used are $Al_2O_3$ and all kinds of glass. In a suitable embodiment the melting tube has a wall thickness which is as small as possible from a mechanical point of view, for example equal to 1.5 mm. As a result of this the inner wall of the melting tube remains below a temperature at which corrosion by components of the melt may take place.

At high melting temperatures the greater part of the heat flow from the melt to the surroundings is in the form of infrared radiation. For this reason under such circumstances a melting tube consisting of clear quartz glass having a low level of infrared absorption is preferred since with such a melting tube the infrared radiation is absorbed in the coolant and does not increase or hardly increases the temperature of the melting tube.

The tube present between the ground screen and the coil serves to prevent electric discharges between the coil and the ground screen. For this reason the tube preferably consists of a material having a high breakdown voltage. No plasmas occur because the coil and screen are placed in the coolant.

Demineralised water is preferably used as a coolant, having a resistivity exceeding 1 Mohm-cm and a minimal tan $\delta$, i.e. it must be as free as possible from organic materials. It is furthermore desired for the cooling water to be free from air bubbles. The coolant also serves to cool the coil.

In a preferred embodiment of a device according to the invention the tube is conically widened at least in that part which is present below the heating zone, the formed glass rod serving as a bottom for the glass melt. The rod is supported and mechanically lowered, the rate of the lowering movement corresponding to the rate at which the starting material is fed onto the melt. The device having a tube with a conical exit comprises at least two zones:

a. a water-cooled zone in which the melt is heated by means of a high-frequency field at a temperature which is as high as possible without material being lost by evaporation. In this zone the starting material is laid on the surface of the melt.

b. a lowermost, partly cooled conically widened part (refining and relaxing zone). In this part the temperature drops to below the solidification point (i.e. that temperature at which no deformation occurs any longer under the weight of the melt). When traversing the temperature gradient between the heating zone and the relaxation zone, the viscosity of the glass will as a matter of fact rise continuously as a result of the dropping temperature. Below the point where no deformation occurs any longer the glass separates from the wall of the melting tube. This point is adjusted automatically at a given height in the conical portion. The conical widening need not be by more than 1° to 2°. It is advantageous to cause the rod to traverse a relaxation zone. In the relaxation zone the desired temperature gradient can be obtained by heating the relevant non-cooled part of the tube by means of a resistance furnace. In this case the rate of manufacture is determined by the rate at which the formed rod is lowered. The advantages of a method of manufacturing rods by using a device having a conically widened melting tube consist in particular in that 1. the coupled-in high frequency power is not of direct influence on the production rate. The melting temperature may be chosen arbitrarily.

2. the production rate of the glass is determined by the rate of the independently controlled mechanical movement of the supported formed glass rod.

3. at a feeding rate of the starting material matched to the rate of the mechanical movement and with a constant heat equilibrium the plane where solidification of the glass melt takes place will adjust at a given place in the conical portion of the tube. Below the plane the rod will separate from the wall.

In another preferred embodiment of the device, the melting tube comprises a constriction in which the area of the cross-section of the constriction is preferably between 50 and 60% of the area of the cross-section of the upper tube part (heating zone). By such a constriction, it is achieved that the partially unmelted material which adjoins the cooled wall cannot move to the non-cooled zone underlying the zone. The free glass flow through the constriction in this device determines the rate of manufacture of the quantity of glass. This flow can be controlled by increasing or decreasing the temperature in the constriction, by moving the constriction in the direction of the center of the coil or in the opposite direction. The velocity of drawing at the rod determines the diameter thereof. The force of drawing at the rod measured in the clamping device is an indication for the temperature of the glass in the constriction.

In this manner it is ensured that a glass rod is obtained which has been well molten and is homogeneous also at the circumference. The rods which are obtained by means of the method according to the invention can be further processed to form optical fibers in various manners, optionally also in line, the rod being fed directly to a fiber forming device.

If desired, the rod can also be drawn in line to form a fiber and be cladded with a synthetic resin or with any other material of lower refractive index than that of the rod.

It is also possible to use the rods as a starting material in the manufacture of optical fibers by means of a double crucible method, optionally in series with the rod-forming device.

An embodiment and a device for carrying out a method according to the invention will now be described in greater detail with reference to the accompanying drawings. In the drawings, FIG. 1 is a diagrammatic sectional view of a device for carrying out the method according to the invention, FIG. 2 is a diagrammatic sectional view of a preferred embodiment of the method according to the invention.

In the following embodiments, the manufacture of rods of glass will be described. Essentially the invention is not restricted thereto. Applicants deem it possible that crystalline material can also be molten in the manner described, in particular in a device without a constriction in the melting tube.

Figure 2:
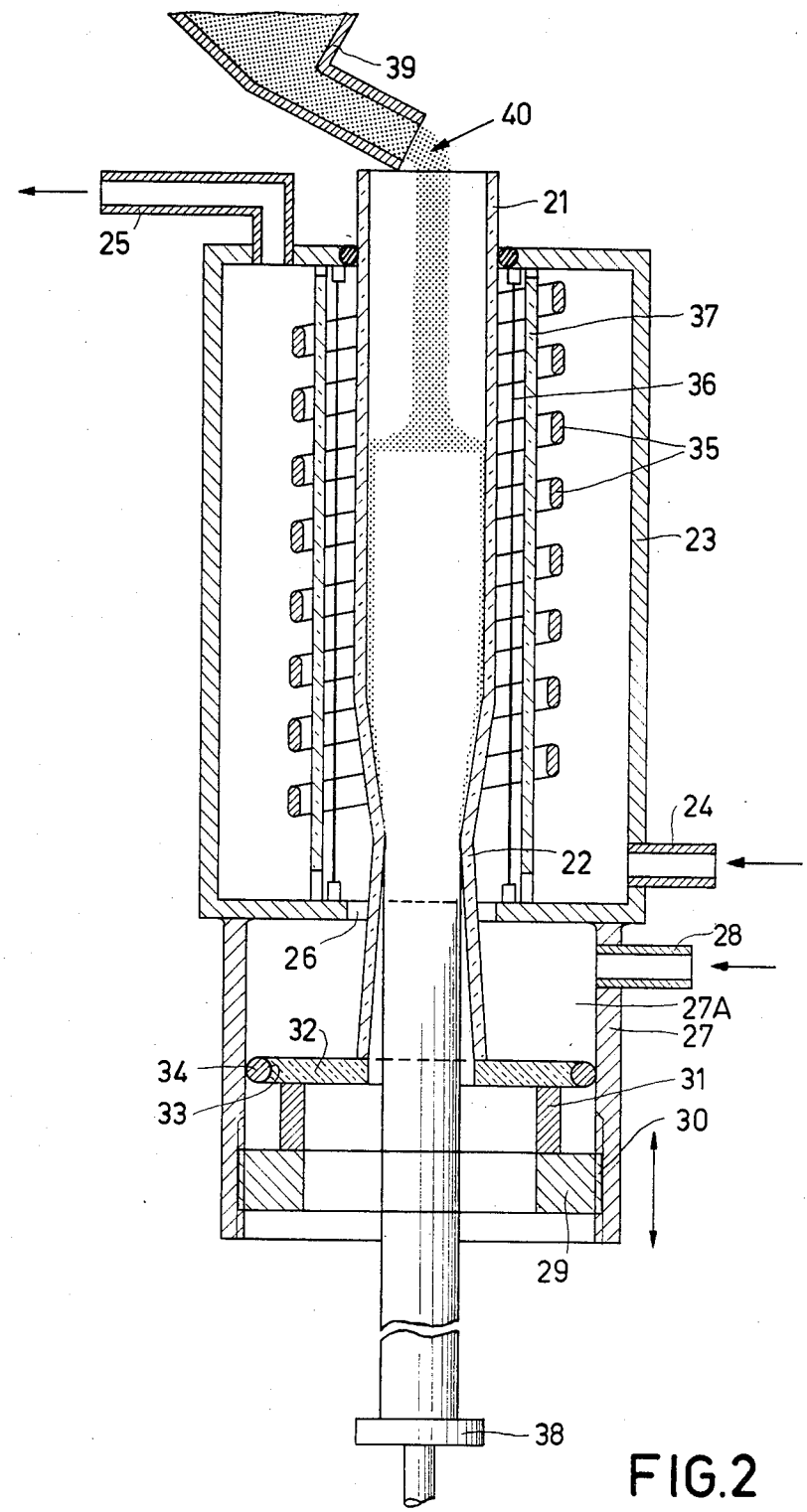

FIG. 1 shows diagrammatically a device for manufacturing rods of glass. The device comprises substantially a pipe 1, for example of quartz glass, a cooling jacket 2 having inlet and outlet tubes 3 and 4 for supplying a removing coolant, for example demineralised water. A coil consisting of eight metal turns 5 is present within the cooling jacket 2. During operation a high-frequency electromagnetic field is generated in the coil. Metal wires 6 of which two are shown in FIG. 1 are drawn around the circumference of the tube at regular mutual distances between the coil turns and the outer wall of the tube 1. The wires 6 extend above and below the coil. During operation the wires 6 are grounded. The grounded screen of wires 6 has proved to be very effective for suppressing plasmas. The lower part of the tube 1 is surrounded by a resistance furnace 7. The rod of glass formed is supported by table 8 which can be lowered mechanically. At the top of the tube 1 a mixture of fragments 9 of glass is laid on a glass melt 11 via a filling device 10. A dry gas can be bubbled through the glass melt 11 via a gas inlet tube 12. The starting procedure of the melting process is as follows.

Tube 1 is filled with glass fragments 9, the supporting table 8 being in such a position that it closes the bottom of the tube 1. A susceptor (not shown) is present in the glass mixture in the heating zone and can take up power from the high-frequency field; in practice the susceptor may be a quartz glass tube which is closed on the lower side and in which a plug of graphite is present. The supply of coolant is now started. The coolant may be demineralised water. A high-frequency field (frequency for example 2.6 MHz) is then generated in the coil 5 and the resistance furnace 7 is switched on. The high-frequency field heats the graphite plug and the surrounding glass fragments 9 are melted by radiation. The volume varies considerably. The drop in level is now compensated for with fresh glass fragments 9 until sufficient glass melt at a sufficiently high temperature is present in the tube 1. The susceptor is now removed. In practice the melting level is kept at approximately ⅔ of the height of the coil. Table 8 is lowered slowly while simultaneously the glass mixture 9 is laid on the melt at the top of the tube 1. If desired, in order to obtain a better mixing and an extra drying in the melt, a dry gas can be bubbled in via the inlet tube 12. A quartz tube 13 is present between the coil 5 and the screen 6.

FIG. 2 shows a preferred embodiment of a device according to the invention. This device comprises a round quartz tube 21 having an inside diameter of 46 mm. The tube 21 has a constriction at 22 where the inside diameter is 35 mm. The tube 21 then widens again to the original diameter. Tube 21 has a wall thickness of 1.0 mm. The tube 21 is surrounded by a housing 23 of metal, for example aluminium. The housing 23 has an inlet tube 24 and an outlet tube 25 for coolant. By the aperture 26 the housing 23 is in open communication with a space enclosed by the cylinder 27. Cylinder 27, for example of synthetic resin (such as PPMA), also comprises an inlet tube 28 for coolant. Within the cylinder 27 is present an annular disc 29 which can be raised or lowered in the cylinder 27 by turning via a scewthread 30. A quartz glass ring 32 bears on the disc 29 via a cylinder 31 and comprises on its circumference a groove 33 in which an O-ring 34 of an elastic material is present which seals the space 27A present above the ring 32 within the cylinder 27 in a liquid-tight manner. Tube 21 is fused to the ring 32. By raising or lowering the disc 29, the constriction 22 can be situated at a higher or at a lower level with respect to the coil 35. During operation a high-frequency field is generated in the coil 35 of metal tape (for example of copper). A number of wires 36 having a diameter of 0.8 mm are regularly distributed around the circumference of the tube between the coil 35 and the housing 21. The mutual distance in this embodiment is 3 mm, and during operation the wires 36 are grounded at the bottom and top sides (not shown). A quartz tube 37 having a wall thickness of 1.0 mm is present between the wires 36 and the coil 35. It has been found in practice that the wires 36 very effectively suppress the formation of plasmas in the glass mixture. The operation of the FIG. 2 device is as follows.

While a supporting table 38 closes the bottom of the tube 21, tube 21 is filled with glass mixture 40 via a filling tunnel 39. Demineralised water is then passed through the space 27A and the space enclosed by the housing 23 via the inlet pipes 28 and 24 respectively. A high-frequency field is generated in the coil 35 (frequency 2.6 MHz, 25 kW output, voltage at the coil in the unloaded condition approximately 10 kV). The starting procedure is the same as already described with reference to the FIG. 1 embodiment.

The grounded wires 36 achieve inter alia that no ionisation occurs in the reacting and melting glass mixture in which large quantities of gases and vapors are released ($CO_2$, $H_2O$) in the proximity of erratically shaped grain surfaces.

After a sufficient quantity of glass mixture has melted and the desired level has been reached, table 38 is slowly lowered mechanically. The constriction 22 ensures that unmolten and unreacted glass mixture remains in the tube 21. The outflow rate can be controlled by a correct adjustment of the local temperature in the melt, namely by controlling the high-frequency field and/or positioning of the constriction 22 with respect to the high-frequency field.

Glass mixture or fragments of glass are fed continuously to the melt in the tube 21 via the filling funnel 39 at the same rate as solid glass is withdrawn from the bottom of the tube 21 as a rod. The diameter of the rod is determined by the rate at which the table 38 is lowered.

In this manner it is possible to manufacture, for example, rods having a diameter between 28 and 34 mm at a rate of 63 mm per hour (1.6 to 2.4 g of glass per minute).

It will be obvious that in a device in accordance with the invention two or more coils, arranged one below the other, may also be present with which the temperature in the melting zone, the refining zone and in the constriction can be controlled independently of each other. The length of the part of the tube in each of the zones determines the residence time in accordance with the rate of flow.

Glasses which normally are melted at temperatures between 1300° C. and 1700° C. or higher can be readily processed in a device in accordance with the invention. Difficulties do not occur either when corrosive glasses having a high alkalimetal oxide content, in particular lithium oxide, are used. By means of a device shown in FIG. 2, rods were continuously manufactured without difficulties from, for example, the following glasses:

A.
62.5 mol% $SiO_2$
12.5 mol.% (CaO+MgO)
5 mol.% $Li_2O$
10 mol.% $Na_2O$
10 mol.% $K_2O$.

Melting temperature 1300° C. In batchwise melting, such glasses corrode a crucible of quartz glass having a wall thickness of 2 mm in 8 hours. No difficulties were encountered in melting and manufacturing rods according to the invention.

B.
62.5 mol.% $SiO_2$
12.5 mol.% $Al_2O_3$
12.5 mol.% ZnO
12.5 mol.% $Na_2O$

Melting temperature 1650° C. Rods from a glass of this composition were manufactured without difficulties by a method according to the invention.

What is claimed is:

1. A device for continuous manufacture of elongated bodies comprising:
   a vertically arranged tube for containing melted starting material,
   a cooling jacket surrounding a heating zone of said tube,
   a coil of metal tape around said heating zone within said cooling jacket, said coil generating a high-frequency electromagnetic field during operation,
   a plurality of metal wires extending parallel to the axis of said tube, said wires being located between said coil and said tube,
   a quartz tube located between said metal wires and said coil, and
   means for flowing coolant through said cooling jacket around said coil and said metal wires.

2. A device according to claim 1, wherein said vertical tube widens conically below said heating zone.

3. A device according to claim 2, wherein the bottom end of said vertical tube widens conically from a constriction.

4. A device according to claim 3, wherein said vertical tube is movable vertically with respect to said coil and cooling jacket.

5. A device according to claim 1, wherein said vertical tube consists of clear quartz glass.

* * * * *